US012092805B2

(12) United States Patent
Kawamura et al.

(10) Patent No.: US 12,092,805 B2
(45) Date of Patent: Sep. 17, 2024

(54) LASER LIGHT SCANNING DEVICE AND LASER LIGHT SCANNING METHOD

(71) Applicant: Nippon Telegraph and Telephone Corporation, Tokyo (JP)

(72) Inventors: Sohan Kawamura, Tokyo (JP); Yuichi Akage, Tokyo (JP); Takashi Sakamoto, Tokyo (JP); Soichi Oka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 484 days.

(21) Appl. No.: 17/625,532

(22) PCT Filed: Jul. 11, 2019

(86) PCT No.: PCT/JP2019/027465
§ 371 (c)(1),
(2) Date: Jan. 7, 2022

(87) PCT Pub. No.: WO2021/005773
PCT Pub. Date: Jan. 14, 2021

(65) Prior Publication Data
US 2022/0276477 A1 Sep. 1, 2022

(51) Int. Cl.
*G02B 26/08* (2006.01)
*B23K 26/082* (2014.01)
(Continued)

(52) U.S. Cl.
CPC ........ *G02B 19/0004* (2013.01); *B23K 26/082* (2015.10); *G02B 19/0047* (2013.01);
(Continued)

(58) Field of Classification Search
CPC .......................... G02B 5/1814; G02B 26/0808
See application file for complete search history.

(56) References Cited

U.S. PATENT DOCUMENTS

| 2015/0013035 A1 | 1/2015 | Humphris et al. |
| 2015/0076125 A1 | 3/2015 | Toyosawa et al. |
| 2018/0311768 A1* | 11/2018 | Tsukui ............... B23K 26/0608 |

FOREIGN PATENT DOCUMENTS

| JP | 5574354 B2 | 8/2014 |
| JP | 2018021930 A | 2/2018 |

OTHER PUBLICATIONS

New Technology Brief, "Laser cleaning method—Method for removing coating film and rust using a portable laser" Registration No. 1624, Shizuoka Prefecture Transportation Board Department Technical Management Division, http://www2.pref.shizuoka.jp/all/new_technique.nsf/7BFBD8898312FB56492581930029788E/$FILE/1624gaiyou.pdf Jun. 12, 2017, 11 pages.

(Continued)

*Primary Examiner* — Joseph P Martinez
(74) *Attorney, Agent, or Firm* — Slater Matsil, LLP

(57) ABSTRACT

A laser light scanning apparatus includes: an optical system that generates parallel light from laser light emitted from a light source; an optical deflector that performs one-dimensional deflection on the parallel light from the optical system; and a diffractive optical element that diffracts deflected light from the optical deflector. The diffractive optical element is configured such that the diffracted light is focused along a predetermined axis that extends from the optical deflector toward the diffractive optical element, and the position at which the diffracted light is focused on the predetermined axis changes according to the incidence position of the deflected light.

13 Claims, 3 Drawing Sheets

(51) Int. Cl.
    *G02B 19/00*       (2006.01)
    *G02F 1/29*        (2006.01)
    *B23K 26/36*      (2014.01)

(52) U.S. Cl.
    CPC ............... *G02F 1/29* (2013.01); *B23K 26/36* (2013.01); *G02F 2203/24* (2013.01)

(56) References Cited

OTHER PUBLICATIONS

Nakamura et al., "Space-charge-controlled electro-optic effect: Optical beam deflection by electro-optic effect and space-charge-controlled electrical conduction," Journal of Applied Physics, vol. 104, Jul. 2, 2008, 10 pages.

Soifer, Victor A., "Methods for Computer Design of Diffractive Optical Elements," Willey Inter-Science, Wiley Series in Lasers and Applications, Dec. 14, 2001, pp. 116-125.

\* cited by examiner

LASER LIGHT SCANNING DEVICE AND LASER LIGHT SCANNING METHOD

CROSS-REFERENCE TO RELATED APPLICATIONS

This application is a national phase entry of PCT Application No. PCT/JP2019/027465, filed on Jul. 11, 2019, which application is hereby incorporated herein by reference.

TECHNICAL FIELD

The present invention relates to a laser light scanning apparatus that scans laser light in order to process metal or the like or remove paint, for example.

BACKGROUND

Laser processing apparatuses are widely used for performing cutting, welding, printing, and the like on metal and resin, and recently, the scope of use has expanded to structural maintenance applications, such as removing rust from metal outdoors (so-called rust removal) and removing paint from metal. For example, the use of a laser processing apparatus for rust removal work has advantages such as noise suppression, the ability to remove rust from metal that has very small protrusions and recessions, and the ability to easily collect scattered material (see PTL 1 and NPL 1 and 2).

A laser processing apparatus for rust removal includes a laser light source and a processing head, a mechanism for rotating an optical part such as a prism in the head at a high speed is used to, for example, two-dimensionally scan laser light in a circle or the like on a rust removal target object, and innovations have been made in order to increase the rust removal surface area per unit of time by optimizing parameters such as the energy density, scanning range, and scanning speed to realize optimum conditions for rust removal (see PTL 1).

Here, besides rust removal work, in laser processing apparatuses that two-dimensionally scan laser light to process metal or the like, optical parts are similarly rotated, or several mirrors are moved at high speed, and performing this two-dimensional scanning generally requires at least two mechanical drive mechanisms, as shown in PTL 2.

CITATION LIST

Patent Literature

PTL 1—Japanese Patent No. 5574354;
PTL 2—Japanese Patent Application Publication No. 2018-21930.

Non Patent Literature

NPL 1—"Laser Cleaning: Method of removing coatings and rust with portable laser", Shizuoka Prefecture Transportation Infrastructure Department, Technology Administrative Division, New Technology and Methods Database, Reg. No. 1624, [retrieved Aug. 23, 2018], Internet URL: http://www2.pref.shizuoka.jp/all/new_technique.nsf/7BFBD8898312FB56492581930029788E/$FILE/1624gaiyou.pdf;
NPL 2—Koichiro Nakamura, Jun Miyazu, Yuzo Sasaki, Tadayuki Imai, Masahiro Sasaura, and Kazuo Fujiura, "Space-charge-controlled electro-optic effect: Optical beam deflection by electro-optic effect and space-charge-controlled electrical conduction", Journal of Applied Physics 104, 013105_2008_;
NPL3—"Methods for Computer Design of Diffractive Optical Elements", WILLEY INTER-SCIENCE, P120-121, Dec. 14, 2001.

SUMMARY

Technical Problem

Here, as disclosed in NPL 3, it is also possible to use a diffractive optical element that forms a desired light intensity distribution without requiring two-dimensional scanning. Using a diffractive optical element makes it possible to reduce the number of components in the device, and also makes it possible to achieve a reduction in size and weight. However, the focal depth of the diffraction image in NPL 3 is uniquely determined by the beam diameter of the light that is incident on the diffractive optical element and focal position, and therefore there is a problem that work efficiency decreases unless control is performed such that error in the distance between the diffractive optical element and the processing target is within the focal depth.

One method of preventing such a reduction involves reducing the numerical aperture of the diffractive optical element to increase the focal depth, but depending on the shape of the diffraction image, a desired diffraction image may not be obtained due to interference of diffracted light even within the range of the focal depth. On the other hand, it may be possible to prevent interference of diffracted light by increasing the numerical aperture to shorten the focal depth, but due to the short focal depth, the distance between the processing target and the diffractive optical element needs to be controlled precisely.

Embodiments of the present invention have been made in view of such problems, and an object of embodiments of the present invention is to provide a laser light scanning apparatus that is capable of obtaining a desired focal depth without dependence on the numerical aperture of the diffractive optical element.

Means for Solving the Problem

In order to solve the foregoing problems, a laser light scanning apparatus according to an aspect of embodiments of the present invention includes: an optical system configured to generate parallel light from laser light emitted from a light source; an optical deflector configured to perform one-dimensional deflection on the parallel light from the optical system; and a diffractive optical element configured to diffract deflected light from the optical deflector, wherein the diffractive optical element is configured such that diffracted light is focused along a predetermined axis that extends from the optical deflector toward the diffractive optical element, and a position at which the diffracted light is focused on the predetermined axis changes according to an incidence position of the deflected light.

In order to solve the foregoing problems, a laser light scanning method according to an aspect of embodiments of the present invention is a laser light scanning method in a laser light scanning apparatus that includes an optical deflector and a diffractive optical element, the method including the steps of: generating parallel light from laser light emitted from a light source; performing one-dimensional deflection on the parallel light to obtain deflected light; and diffracting the deflected light, wherein in the diffracting step, diffracted light is focused along a predetermined axis that extends from the optical deflector toward the diffractive optical element, and the deflected light is diffracted such that a position at which the diffracted light is focused on the predetermined axis changes according to an incidence position of the deflected light.

Effects of Embodiments of the Invention

According to embodiments of the present invention, it is possible to provide a laser light scanning apparatus that is capable of obtaining a desired focal depth without dependence on the numerical aperture of the diffractive optical element.

DETAILED DESCRIPTION OF ILLUSTRATIVE EMBODIMENTS

Hereinafter, embodiments of the present invention will be described with reference to the drawings. The present invention can be implemented in many different embodiments and is not intended to be limited to the embodiments of the present invention described below.

<Configuration of Laser Light Scanning Apparatus>

Figure 1A:
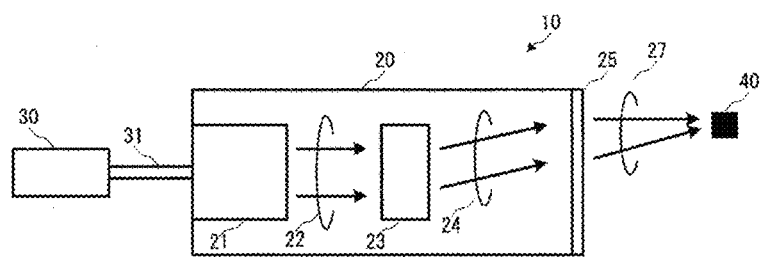
FIG. 1A is a diagram showing a configuration example of a laser light scanning apparatus (transmission type) of the present invention.
Figure 1B:
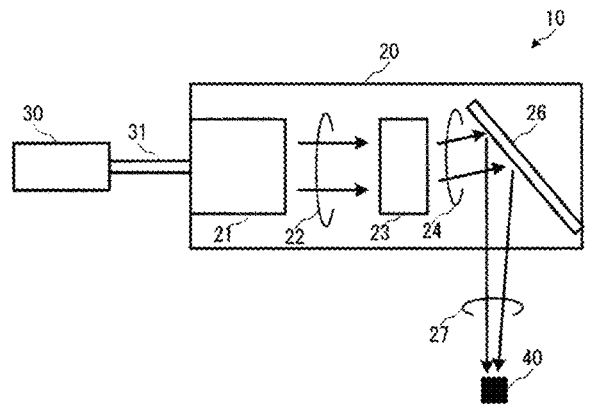
FIG. 1B is a diagram showing a configuration example of a laser light scanning apparatus (reflection type) of the present invention.

Configurations of a laser light scanning apparatus according to an embodiment of the present invention will be described with reference to FIGS. 1A and 1B. The laser light scanning apparatus 10 includes a head portion 20 for irradiating the surface of the processing target with the laser light emitted from a light source 30 and propagated by an optical fiber 31, and the head portion 20 includes a parallel light generation optical system 21, an optical deflector 23, and a transmission-type diffractive optical element 25 (FIG. 1A) or a reflection-type diffractive optical element 26 (FIG. 1B).

The laser light emitted from the light source 30 is propagated by the optical fiber 31, enters the head portion 20, and is converted into parallel light 22 by the parallel light generation optical system 21. The parallel light 22 is deflected by the optical deflector 23, resulting deflected light 24 is diffracted by the transmission-type diffractive optical element 25 or the reflection-type diffractive optical element 26, and resulting diffracted light 27 is focused on the surface of the processing target.

The parallel light 22 deflected by the optical deflector 23 passes through the transmission-type diffractive optical element 25 or is reflected by the reflection-type diffractive element 26 to form a desired light intensity distribution, that is to say a diffraction image 40. A desired focal depth is scanned by changing the focal distance of the diffracted light 27 with use of the transmission-type diffractive optical element 25 or the reflection-type diffractive optical element 26, and the surface of the processing target can be subjected to predetermined processing or the like with use of the diffraction image 40.

<Diffractive Optical Element>

Figure 2:
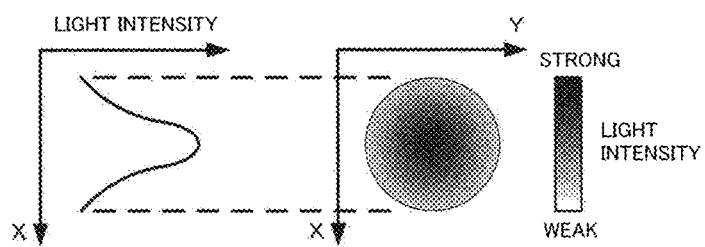
FIG. 2 is a diagram showing an example of a light intensity distribution and profile of incident light.
Figure 3A:
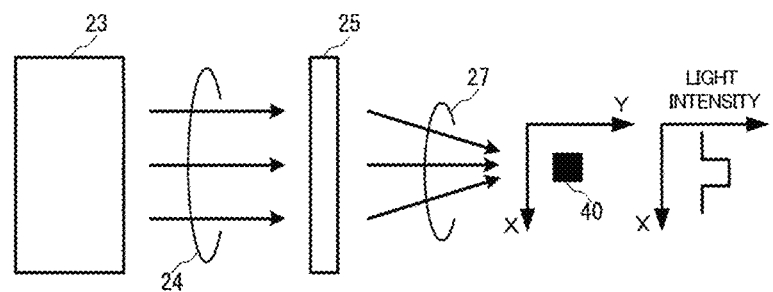
FIG. 3A is a diagram for describing a transmission-type diffractive optical element according to an embodiment of the present invention.
Figure 3B:
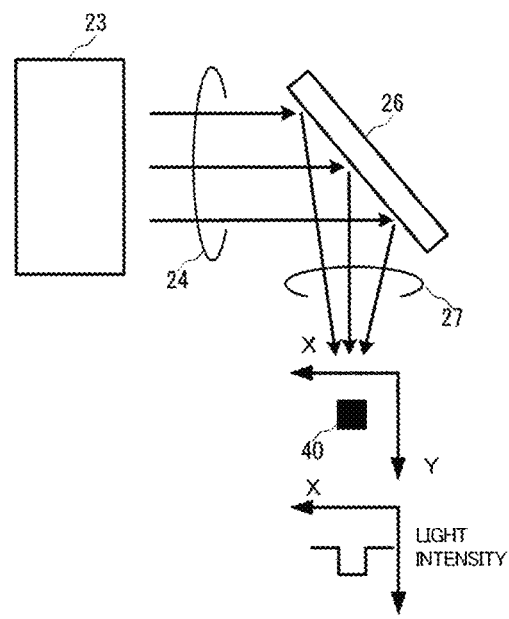
FIG. 3B is a diagram for describing a reflection-type diffractive optical element according to an embodiment of the present invention.

The diffractive optical element is an optical element that is capable of forming laser light incident on the diffractive optical element into a light intensity distribution having a predetermined shape. By diffracting laser light having a light intensity distribution and profile as shown in FIG. 2, a diffraction image 40 that has a light intensity distribution with a predetermined shape such as a quadrangle can be formed. The diffractive optical element may be the transmission-type diffractive optical element 25 that transmits and focuses the incident deflected light 24 as shown in FIG. 3A, or the reflection-type diffractive optical element 26 that reflects and focuses the incident deflected light 24 as shown in FIG. 3B. In the embodiment of the present invention, either the transmissive-type or the reflection-type diffractive optical element can be used. The diffractive optical elements 25 and 26 can be attached to and detached from the head portion 20, and a diffraction image 40 having a desired light intensity distribution can be obtained by swapping the diffractive optical elements according to the application of the laser scanning device.

First Embodiment

Figure 4A:
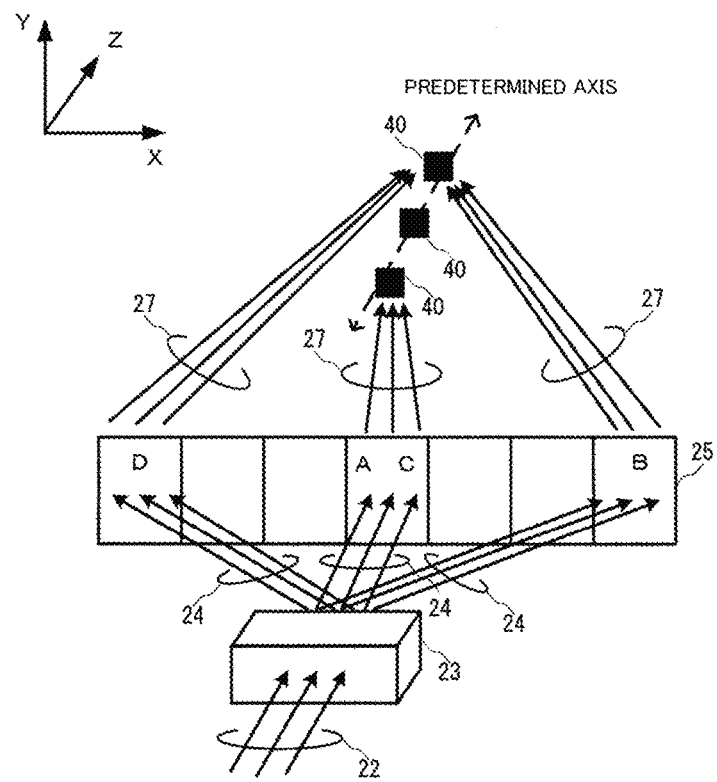
FIG. 4A is a diagram showing a configuration example of a laser light scanning apparatus according to a first embodiment of the present invention.

In the present embodiment, as shown in FIG. 4A, the optical deflector 23 that performs a one-dimensional deflection operation using a mechanical drive is combined with the diffractive optical element 25 that has been subjected to predetermined processing, thus realizing beam scanning that can obtain a desired focal depth without depending on the numerical aperture of the diffractive optical element. The optical deflector 23 may be any mechanical drive mechanism may be used as long as it can perform a one-dimensional deflection operation on a beam.

The diffractive optical element 25 of FIG. 4A is divided into a plurality of sections along the beam scanning direction of the optical deflector 23, and has a detailed structure that is different for each section so that the focal distance of the diffraction image 40 is different in each section. In FIG. 4A, the diffracted light is focused on a predetermined axis, such as an axis parallel to the direction from the optical deflector 23 toward the diffractive optical element 25. In FIG. 4A, the direction of the incident light that is incident on the optical deflector 23 is parallel to the Z axis of the figure, and the diffracted light is focused on this Z axis.

The axis on which the diffracted light is focused is not limited to the above example, and the diffracted light can be focused on a predetermined axis by performing predetermined processing on the diffractive optical element according to a desired beam scanning shape or the like. According to the present embodiment, an optical deflector that performs a one-dimensional deflection operation and a diffractive optical element that has been subjected to a predetermined process are combined to obtain a desired focal depth without dependence on the numerical aperture of the diffractive optical element.

The diffractive optical element 25 is provided with a detailed structure that is different for each section so that the focal distance of the diffraction image 40 is different in each section. For this reason, due to the one-dimensional beam deflection operation performed by the optical deflector 23 by changing the position where the deflected light 24 is incident on the diffractive optical element 25 over time, it is possible to perform beam scanning so as to form the diffraction image at a desired focal depth on the predetermined axis.

Figure 4B:
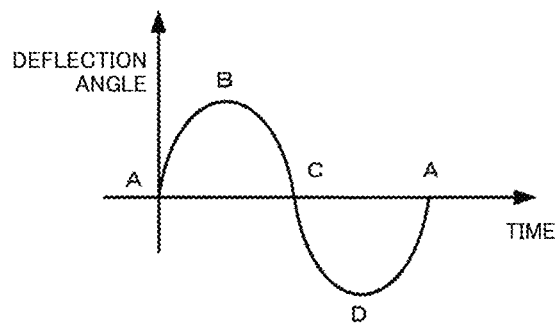
FIG. 4B is a diagram showing an operation example of an optical deflector according to the first embodiment of the present invention.

FIG. 4B shows an example of the deflection operation of the optical deflector 23, and shows how incident positions (A to D) where the deflected beam is incident on the diffractive optical element 25 change over time. In FIG. 4B, at a time 0, the deflected beam irradiates a section A. As the beam is scanned to the right in FIG. 4A over time and passes through the various sections, the formation position of the diffraction image 40 in the direction of the incident light on the optical deflector 23, that is to say in the direction parallel to the Z axis in the figure, changes over time, and when the phase becomes $\pi/2$, the section B in FIG. 4A is irradiated, and the diffraction image 40 is formed at the farthest focal position on the predetermined axis.

Thereafter, the beam is scanned to the left in FIG. 4A, and when the phase becomes $3\pi/2$, the beam reaches the section D, and the diffraction image 40 is again formed at the farthest focal position. Here, when the section D is reached, the image may be formed at the same distance as the imaging distance corresponding to the section B, or the image may be formed farther than the imaging distance corresponding to the section B.

A longer focal depth can be realized by designing the diffractive optical element 25 so that the image is formed increasingly farther than the imaging distance corresponding to the section B as the position moves to the left of the section A in FIG. 4A. Further, the desired focal depth may be obtained by increasing or decreasing the number of sections of the diffractive optical element 25 or increasing or decreasing the deflection angle of the optical deflector 23 according to the desired focal depth.

In this way, according to the present embodiment, the optical deflector 23 that performs a one-dimensional deflection operation using a mechanical drive is combined with the diffractive optical element 25 that has been subjected to predetermined processing, thus making it possible to realize a laser light scanning apparatus that can obtain a desired focal depth without depending on the numerical aperture of the diffractive optical element.

Specific Examples of Laser Light Scanning Apparatus (Mechanical Drive)

In the configuration shown in FIG. 4A, a laser light scanning apparatus controls the focal depth a beam by deflecting the beam at 500 Hz by mechanically driving a mirror. At this time, the energy density of the light incident on the optical deflector 23 was 8 mJ/mm$^2$, and the energy conversion efficiency of the transmission-type diffractive optical element 25, that is to say the value obtained by dividing the energy of the diffraction image by the energy of the incident light, was 0.9.

Metal processing was performed while controlling the focal depth using the transmission-type diffractive optical element 25 that has the above energy conversion efficiency and can form a square diffraction image 40 so as to have the same energy density as the incident light of the diffractive optical element. It was possible to eliminate the need for a mechanism that precisely controls the distance between the diffractive optical element 25 and the processing target, maintain the desired light intensity distribution without changing the energy density, and perform metal processing while controlling the focal depth.

Second Embodiment

In the first embodiment, a mechanical drive mechanism is used as the optical deflector 23, but it is also possible to use an optical deflector 23 that utilizes an electro-optical effect that does not require a mechanical drive mechanism. One example of the optical deflector 23 that utilizes the electro-optical effect is an optical deflector that uses a potassium niobate titanate (KTa$_{1-x}$Nb$_x$O$_3$: KTN) single crystal. With a KTN single crystal, it is possible to deflect the laser light by applying a voltage, as described in NPL 2.

Furthermore, the optical deflector 23 using a KTN single crystal can scan the beam at high speed up to about 500 kHz, and it is possible to improve the work efficiency as compared with the case of using the optical deflector 23 that has a mechanical drive mechanism.

Specific Examples of Laser Light Scanning Apparatus

In the configuration of FIG. 4A, a device was made to scan a beam at 500 kHz with a KTN single crystal optical deflector that utilizes the electro-optic effect. At this time, the energy density of the light incident on the optical deflector 23 was 8 mJ/mm$^2$, and the energy conversion efficiency of the diffractive optical element 25, that is to say the value obtained by dividing the energy of the diffraction image by the energy of the incident light, was 0.9.

Metal processing in the optical axis direction was performed while controlling the focal depth using the transmission-type diffractive optical element 25 that has the above energy conversion efficiency and can form a circular diffraction image 40 so as to have the same energy density as the incident light of the diffractive optical element. It was possible to eliminate the need for a mechanism that precisely controls the distance between the diffractive optical element 25 and the processing target, maintain the desired light intensity distribution without changing the energy density, and perform metal processing while controlling the focal depth. Also, by using the KTN single crystal optical deflector, the working time could be reduced to about $\frac{1}{1000}$ of that when using the optical deflector that utilizes a mechanical drive mechanism.

INDUSTRIAL APPLICABILITY

Embodiments of the present invention can be used in a laser light scanning apparatus that scans laser light for processing metal or the like or removing paint, for example.

REFERENCE SIGNS LIST

10 laser light scanning apparatus, 20 head portion, 21 parallel light generation optical system, 22 parallel light, 23 optical deflector, 24 deflected light, 25 transmission-type diffractive element, 26 reflection-type diffractive element, 27 diffracted light, 30 light source, 31 optical fiber, 40 diffraction image.

The invention claimed is:

1. A laser light scanning apparatus comprising:
an optical system configured to generate parallel light from laser light emitted from a light source;
an optical deflector configured to perform one-dimensional deflection on the parallel light from the optical system; and
a diffractive optical element configured to diffract deflected light from the optical deflector to obtain diffracted light, wherein the diffractive optical element is configured such that the diffracted light is focused along a predetermined axis that extends from the optical deflector toward the diffractive optical element to obtain focused diffracted light, and wherein a position at which the diffracted light is focused on the predetermined axis changes according to an incidence position of the deflected light.

2. The laser light scanning apparatus according to claim 1, wherein the diffractive optical element is configured such that the diffracted light is focused on an axis that is parallel to a direction from the optical deflector toward the diffractive optical element.

3. The laser light scanning apparatus according to claim 1, wherein the diffractive optical element is divided into a plurality of sections, and has been processed such that light emitted onto the plurality of sections is focused at different positions corresponding to the plurality of sections.

4. The laser light scanning apparatus according to claim 1, wherein the optical deflector is an optical deflector that utilizes an electro-optical effect.

5. The laser light scanning apparatus according to claim 4, wherein the optical deflector that utilizes the electro-optical effect is an optical deflector that uses a KTN single crystal.

6. The laser light scanning apparatus according to claim 1, wherein the diffractive optical element is configured to be removable.

7. The laser light scanning apparatus according to claim 1, wherein the diffractive optical element is configured such that an energy density of the focused diffracted light is equivalent to an energy density of the laser light incident on the diffractive optical element.

8. A laser light scanning method in a laser light scanning apparatus that includes an optical deflector and a diffractive optical element, the method comprising the steps of:
generating parallel light from laser light emitted from a light source;
performing one-dimensional deflection on the parallel light to obtain deflected light; and
diffracting the deflected light, wherein while diffracting the deflected light, diffracted light is focused along a predetermined axis that extends from the optical deflector toward the diffractive optical element to obtain focused diffracted light, and wherein the deflected light is diffracted such that a position at which the diffracted light is focused on the predetermined axis changes according to an incidence position of the deflected light.

9. The laser light scanning method according to claim 8, wherein the diffractive optical element is divided into a plurality of sections, and has been processed such that light emitted onto the plurality of sections is focused at different positions corresponding to the plurality of sections.

10. The laser light scanning method according to claim 8, wherein the optical deflector is an optical deflector that utilizes an electro-optical effect.

11. The laser light scanning method according to claim 10, wherein the optical deflector that utilizes the electro-optical effect is an optical deflector that uses a KTN single crystal.

12. The laser light scanning method according to claim 8, further comprising removing the diffractive optical element.

13. The laser light scanning method according to claim 8, wherein an energy density of the focused diffracted light is equivalent to an energy density of the laser light incident on the diffractive optical element.

* * * * *